(12) United States Patent
Su et al.

(10) Patent No.: US 8,054,519 B2
(45) Date of Patent: Nov. 8, 2011

(54) WAVELENGTH-MULTIPLEX AND SPACE-MULTIPLEX HOLOGRAPHIC STORAGE DEVICE

(75) Inventors: Wei-Chia Su, Hsinchu (TW); Yeh-Hung Chen, Hsinchu (TW); Te-Yuan Chung, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 237 days.

(21) Appl. No.: 12/379,572

(22) Filed: Feb. 25, 2009

(65) Prior Publication Data

US 2010/0073747 A1    Mar. 25, 2010

(30) Foreign Application Priority Data

Sep. 23, 2008 (TW) ................................ 97136465 A (51) Int. Cl.
*G03H 1/10* (2006.01)
*G03H 1/12* (2006.01)

(52) U.S. Cl. ................. 359/10; 359/11; 359/24; 359/35; 369/103

(58) Field of Classification Search ..................... 359/10, 359/11, 22, 24, 30, 35
See application file for complete search history.

(56) References Cited

U.S. PATENT DOCUMENTS

| | | | |
|---|---|---|---|
| 3,761,156 A * | 9/1973 | Mohon et al. | 434/42 |
| 7,200,097 B2 * | 4/2007 | Meyrueis et al. | 369/103 |
| 7,480,084 B2 * | 1/2009 | Ingwall et al. | 359/24 |
| 7,595,922 B2 * | 9/2009 | Yamatsu et al. | 359/22 |
| 2007/0297032 A1 * | 12/2007 | Harvey et al. | 359/22 |

* cited by examiner

*Primary Examiner* — Audrey Y Chang
(74) *Attorney, Agent, or Firm* — Rosenberg, Klein & Lee (57) ABSTRACT

The present invention discloses a wavelength-multiplex and space-multiplex holographic storage device, which comprises a storage medium, a plurality of signal light beams and at least one reference light beam. The signal light beams have different wavelengths and illuminate the storage medium. The reference light beam illuminates the storage medium and interferes with the signal light beams to form a plurality of interference patterns. The interference patterns are respectively stored on different-depth storage layers of the storage medium. The present invention not only has a high access rate but also has a large storage capacity.

16 Claims, 10 Drawing Sheets

WAVELENGTH-MULTIPLEX AND SPACE-MULTIPLEX HOLOGRAPHIC STORAGE DEVICE

BACKGROUND OF THE INVENTION

1. Field of the Invention

The present invention relates to a storage device, particularly to a wavelength-multiplex and space-multiplex holographic storage device.

2. Description of the Related Art

With the fast increasing amount of information, the capacity of a storage device should also increase as much. However, the capacity of the current optical disc has reached the limit. Therefore, developing higher capacity storage technologies should be the prior task, and the holographic storage technology is a high potential one among them.

Figure 1:
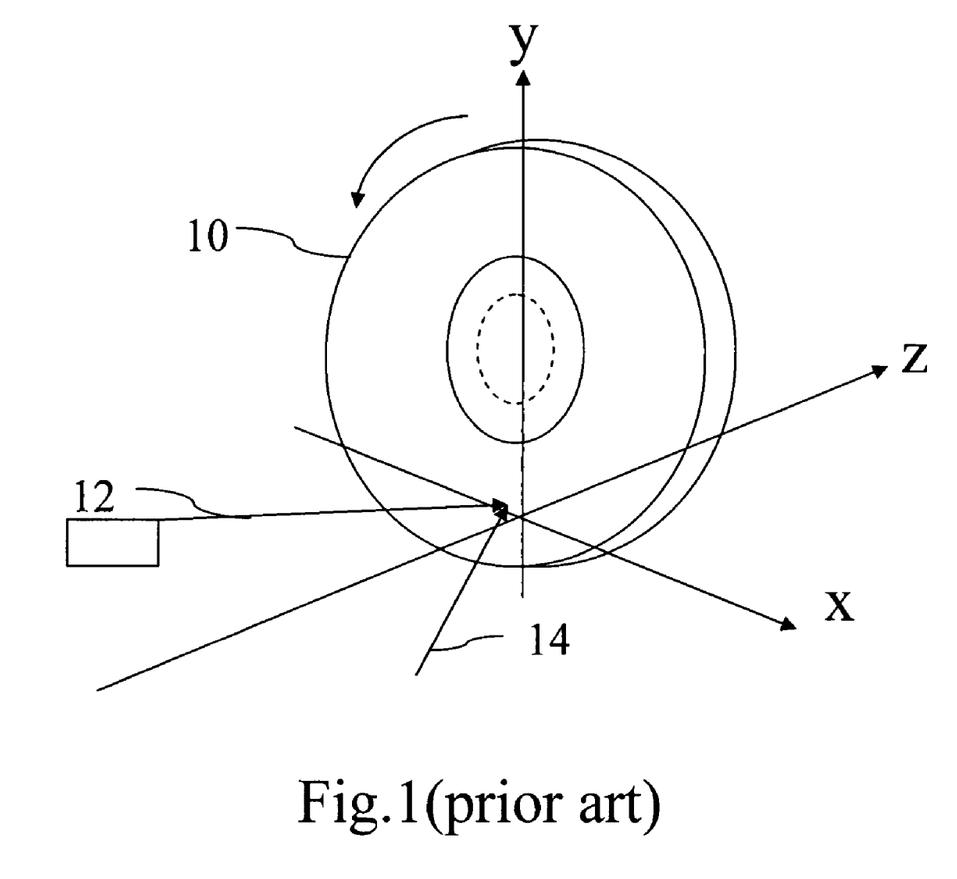
FIG. 1 is a diagram schematically showing a conventional holographic storage technology.

Refer to FIG. 1. In one holographic storage technology, a coded signal light beam 14 interferes with a coherent reference light beam 12 to form an interference pattern, and the interference pattern is stored on a holographic disc 10. The signal light beam 14 usually has a single wavelength. If there are several signal light beams, all the signal light beams have only a single wavelength also. The single-wavelength light beams store information on the rotating holographic disc 10. However, the information storage is only two-dimensional. Therefore, such a technology has a lower access rate and a smaller storage capacity. In another holographic storage technology, a frequency-modulation device modulates a signal light beam, and the frequency-modulated light beam is used to store information. However, the access rate is decreased by the frequency-modulation process.

Thus, the present invention proposes a wavelength-multiplex and space-multiplex holographic storage device having a higher access rate and a larger storage capacity to solve the abovementioned problems.

SUMMARY OF THE INVENTION

The primary objective of the present invention is to provide a wavelength-multiplex and space-multiplex holographic storage device, which has a high access rate.

Another objective of the present invention is to provide a wavelength-multiplex and space-multiplex holographic storage device, which has a large storage capacity.

To achieve the abovementioned objectives, the present invention proposes a wavelength-multiplex and space-multiplex holographic storage device, which comprises a storage medium, several signal light beams respectively having different wavelengths and illuminating the storage medium, and a reference light beam illuminating the storage medium and respectively interfering with the signal light beams to form interference patterns, which are stored in different positions of different-depth storage layers of the storage medium.

Below, the embodiments are described in detail in cooperation with the attached drawings to make easily understood the technical contents and accomplishments of the present invention.

BRIEF DESCRIPTION OF THE RELATED ART

DETAILED DESCRIPTION OF THE INVENTION

Figure 2:
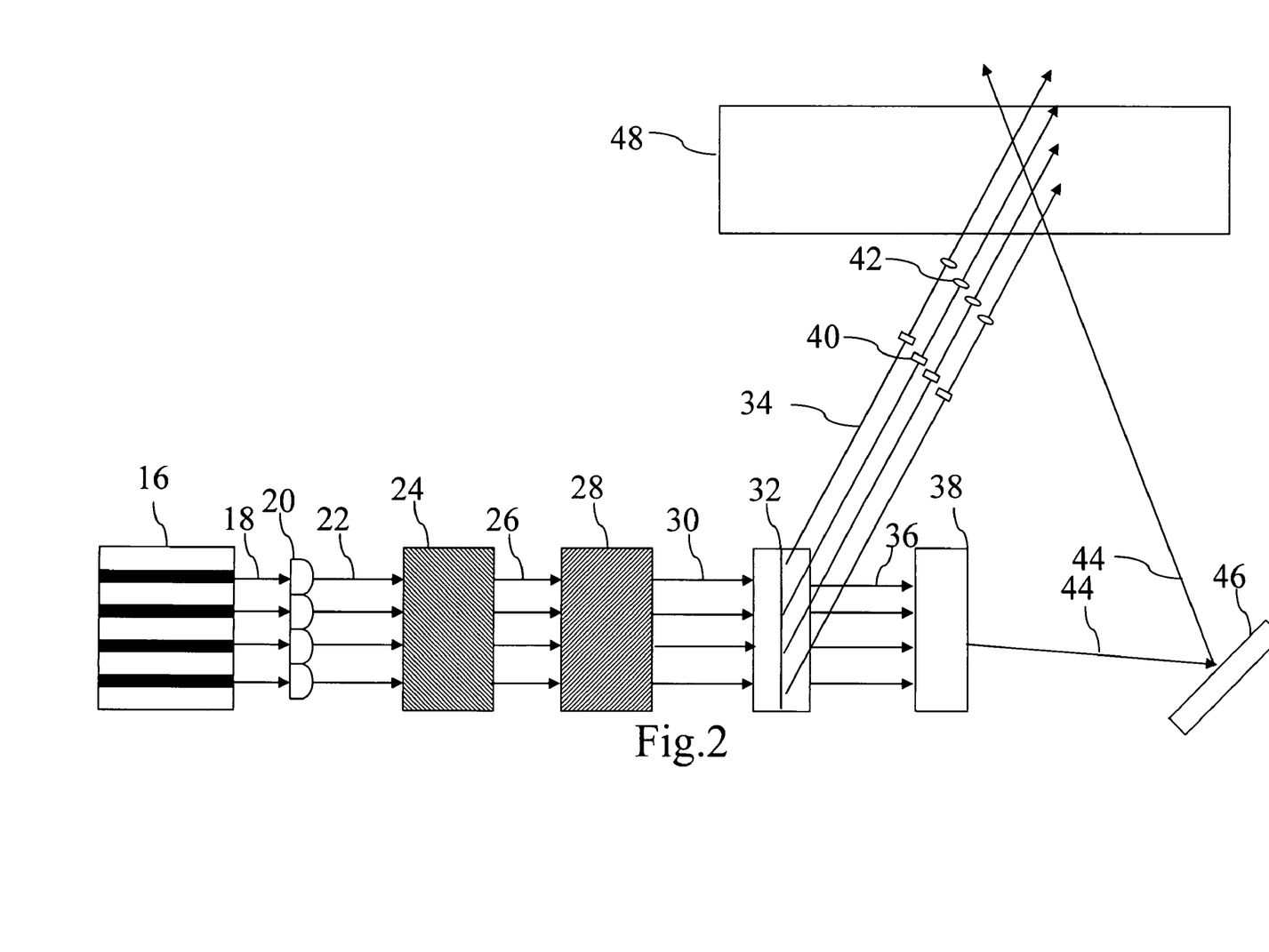
FIG. 2 is a diagram schematically showing a wavelength-multiplex and space-multiplex holographic storage device according to the present invention.

Refer to FIG. 2 a diagram schematically showing a wavelength-multiplex and space-multiplex holographic storage device according to the present invention. The device of the present invention comprises a laser source assembly 16 having at least one laser emitter. The laser source assembly 16 is a diode laser array or an optical fiber laser array. The laser source assembly 16 is a coherent light source emitting several multi-longitudinal-mode coherent laser beams 18. A volume holographic grating 24 uses a filter or feedback mechanism to select different longitudinal modes to respectively narrow multi-longitudinal-mode coherent laser beams 22 and increase the coherent lengths thereof, and then outputs the spectrum-narrowed laser beams 26. As the spectrum-narrowed laser beams 26 are respectively narrowed in different longitudinal modes, they have different wavelengths. The feedback mechanism of the volume holographic grating 24 can increase the coherent length from tens of microns to centimeters. Thus, the system can use a lower alignment standard. The volume holographic grating 24 may be a discrete-period volume Bragg grating, a continuously-varying-period volume Bragg grating, or a fiber Bragg grating. A lens array 20 is used to focus the multi-longitudinal-mode coherent laser beams 22 on the volume holographic grating 24. A nonlinear optical waveguide array 28, which is made of a nonlinear crystal, performs a nonlinear wavelength conversion to convert the spectrum-narrowed laser beams 26 to an application waveband, such as a visible waveband (but not limited to the visible waveband). The nonlinear wavelength conversion will further increases light coherency. Thus is formed several high-coherency spectrum-narrowed signal light beams 30, which have different wavelengths. The nonlinear optical waveguide array 28 contains a multiple grating-period quasi-phase-matched (QPM) nonlinear optical waveguide/fiber array or a fan-out grating-period QPM nonlinear optical waveguide/fiber array. A splitter 32 receives the high-coherency spectrum-narrowed signal light beams 30 and generates a plurality of signal light beams 34 and a plurality of base light beams 36. The signal light beams 34 and the base light beams 36 are coherent light beams, and the signal light beams 34 respectively have different wavelengths. Each of the signal light beams 34 passes through a spatial light modulator 40 and a lens 42 and then reaches a holographic disc 48. After passing through the spatial light modulator 40, the signal light beam 34 further carries the information the spatial light modulator 40 bears to the holographic disc 48. A coupling device 38 couples the base light beams 36 into a single reference light beam 44, and the reference light beam 44 is a coherent light beam. A reflection device 46 reflects the reference light beam 44 to the holographic disc 48. The reference light beam 44 interferes with each signal light beam 34 to form an interference pattern, and the holographic disc 48 records the interference pattern. A control unit controls the directions of the signal light beams 34 and the reference light beam 44 or moves the holographic disc 48 to constantly shift the storage position during the storage process. When the holographic disc 48 is static, the control unit varies the directions of the signal light beams 34 and the reference light beam 44. When the control unit moves the holographic disc 48, it is unnecessary to vary the directions of the signal light beams 34 and the reference light beam 44.

Figure 3:
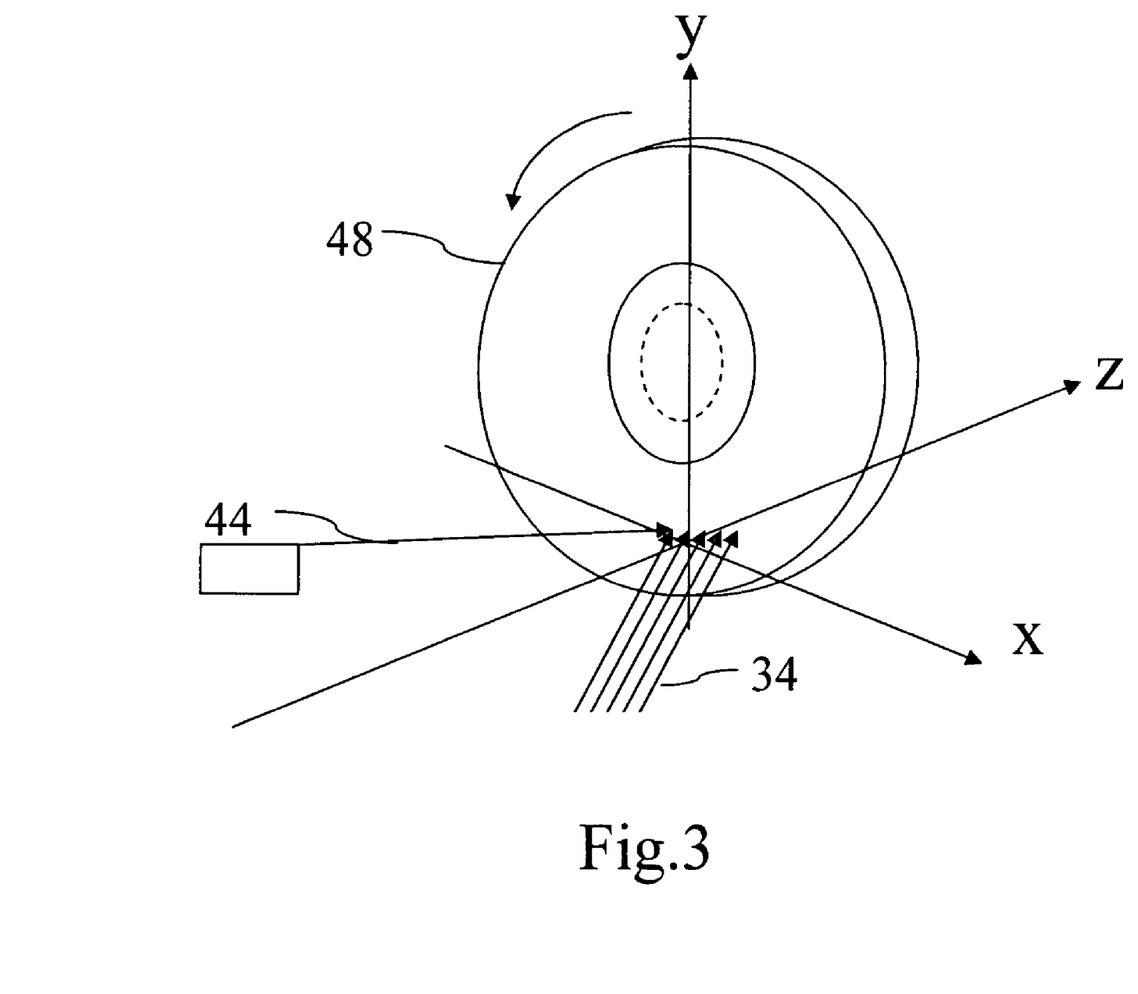
FIG. 3 is a perspective view schematically showing the process that information is stored on a holographic disc according to the present invention.
Figure 4A:
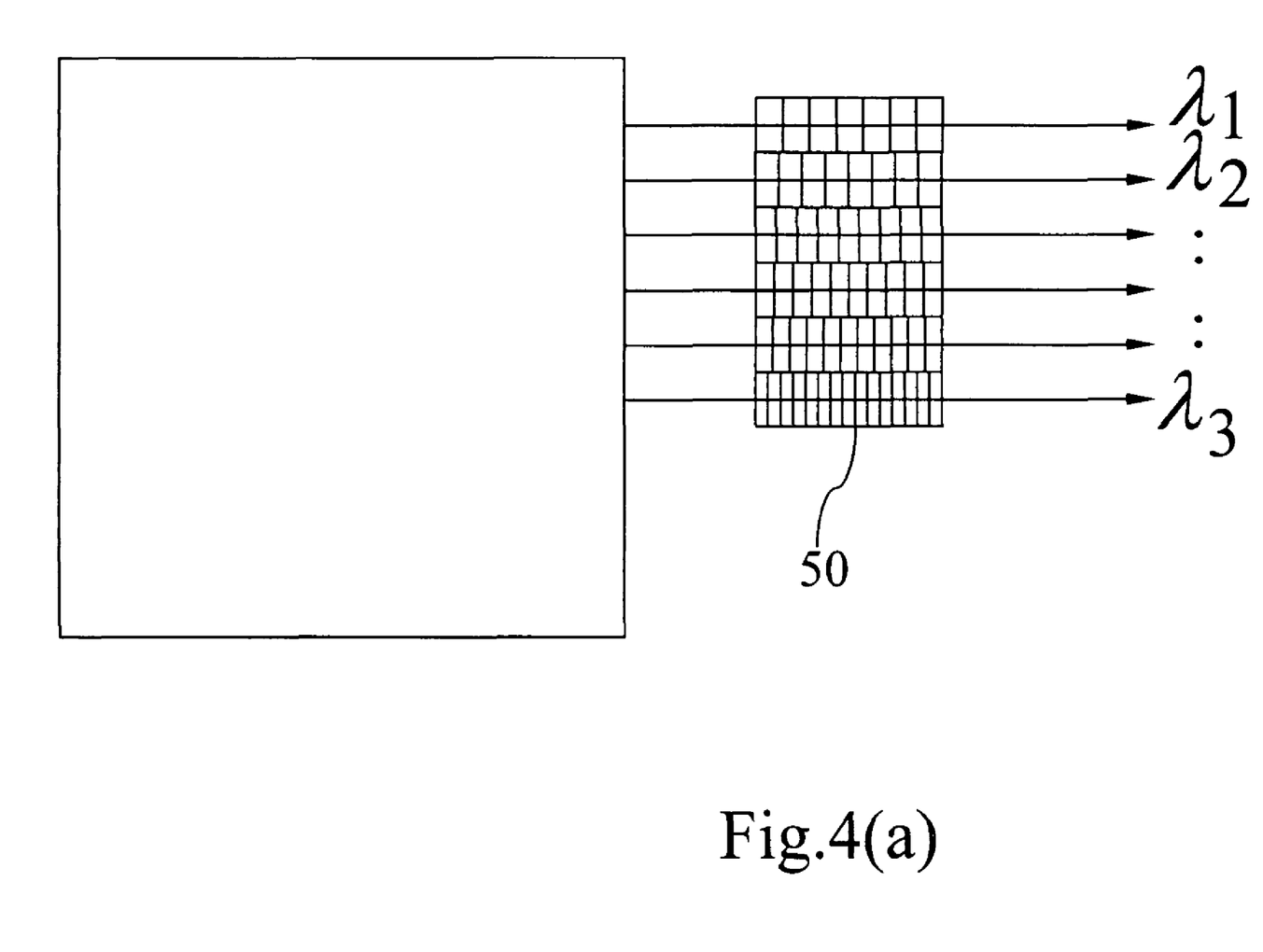
FIGS. 4(a)-4(c) are diagrams schematically showing several types of volume holographic gratings.
Figure 4B:
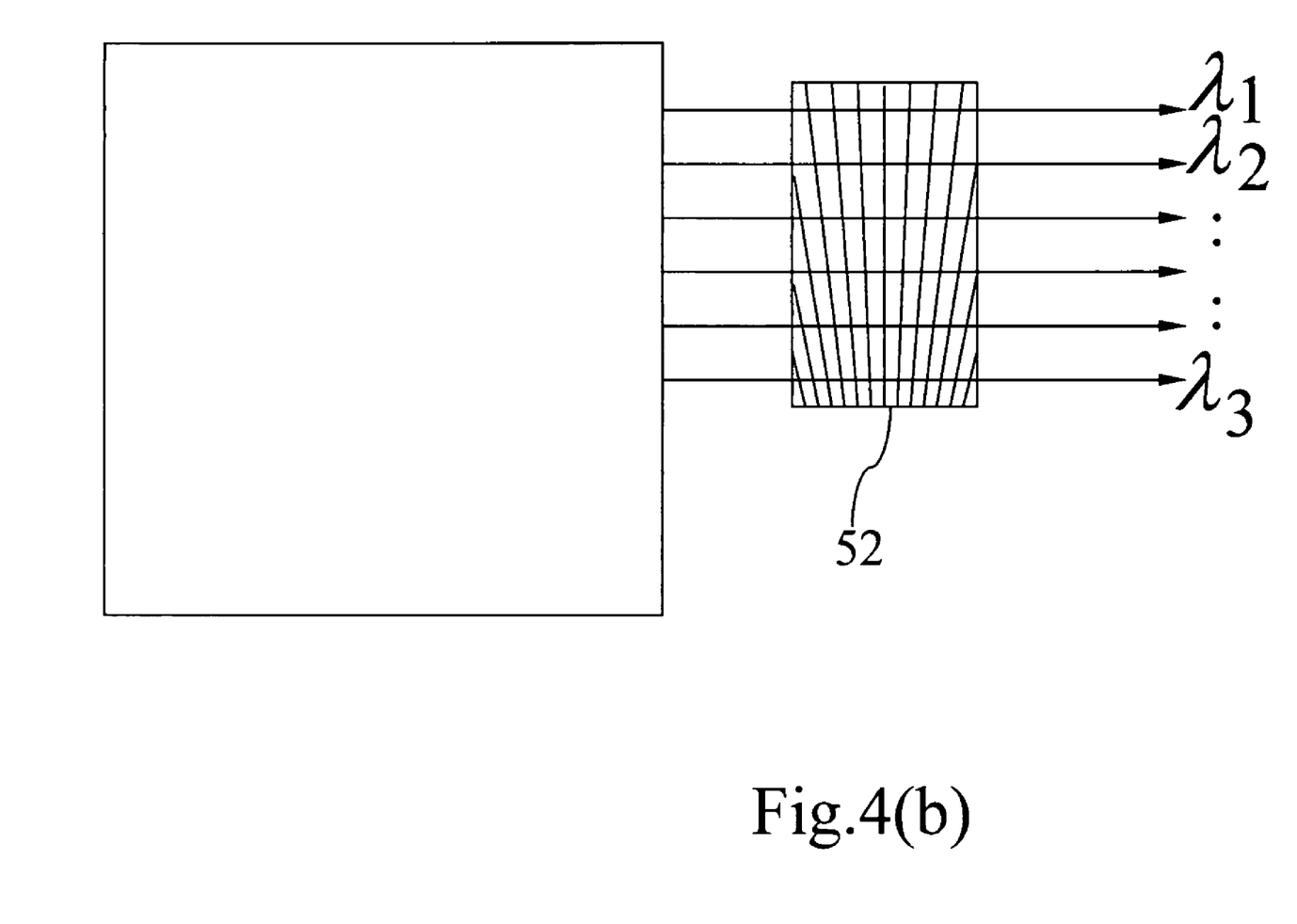
Figure 4C:
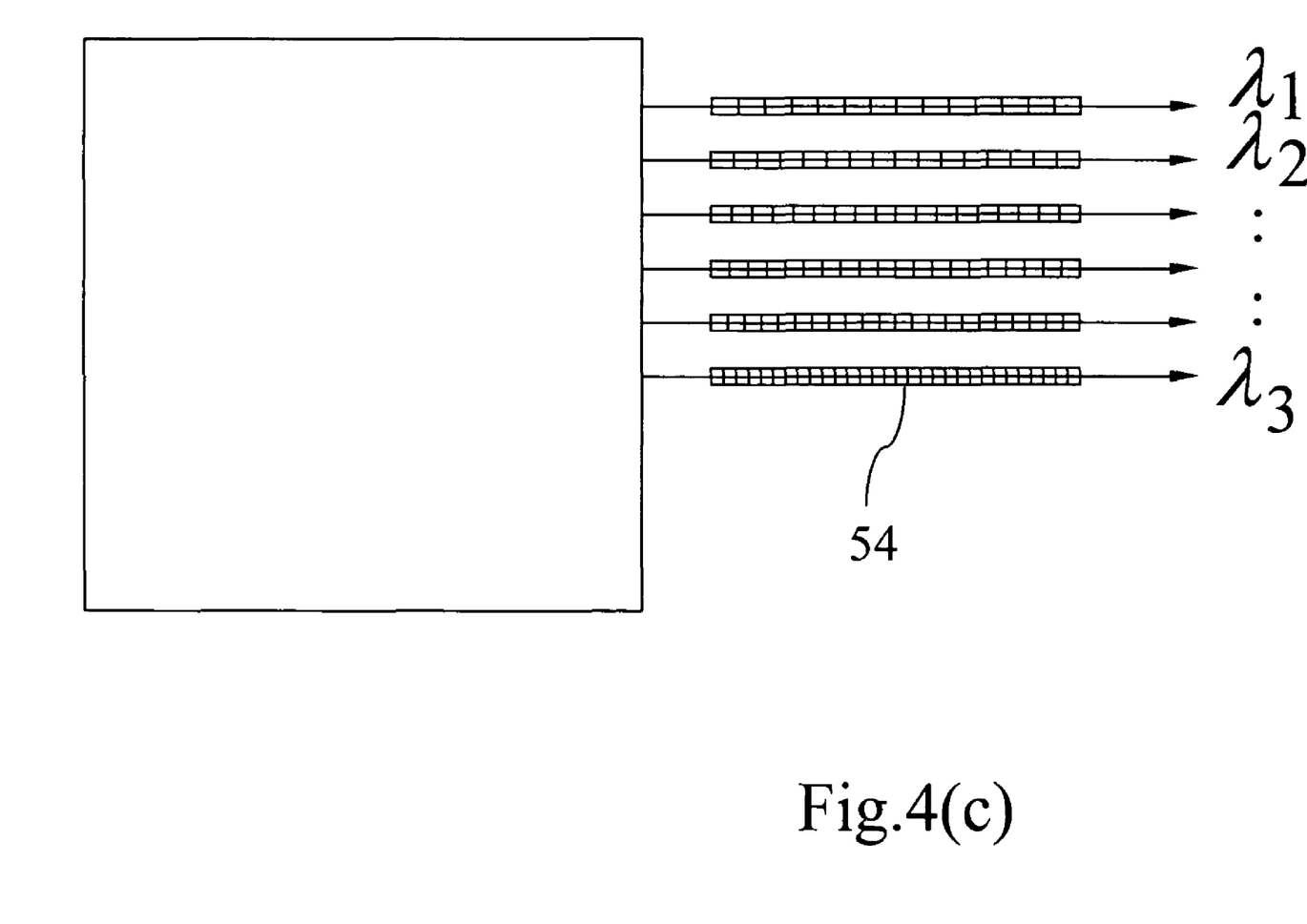

Refer to FIG. 3. When the holographic disc 48 rotates around the central axis during the storage process, the storage position is constantly shifted no matter whether the directions of the signal light beams 34 and the reference light beam 44 are varied or not. Refer to FIGS. 4(*a*)-4(*c*) diagrams schematically showing several types of volume holographic gratings. In FIG. 4(*a*), a discrete-period volume Bragg grating assembly 50 has gratings with discrete grating periods to respectively narrow incident laser beams with a filter or feedback mechanism to obtain different-wavelength spectrum-narrowed laser beams. In FIG. 4(*b*), a continuously-varying-period Bragg grating assembly 52 has gratings with continuously-varying grating periods to respectively narrow incident laser beams with a filter or feedback mechanism to obtain different-wavelength spectrum-narrowed laser beams. In FIG. 4(*c*), a fiber Bragg grating assembly 54 has fiber gratings with different grating periods to respectively narrow incident laser beams with a filter or feedback mechanism to obtain different-wavelength spectrum-narrowed laser beams.

Figure 5A:
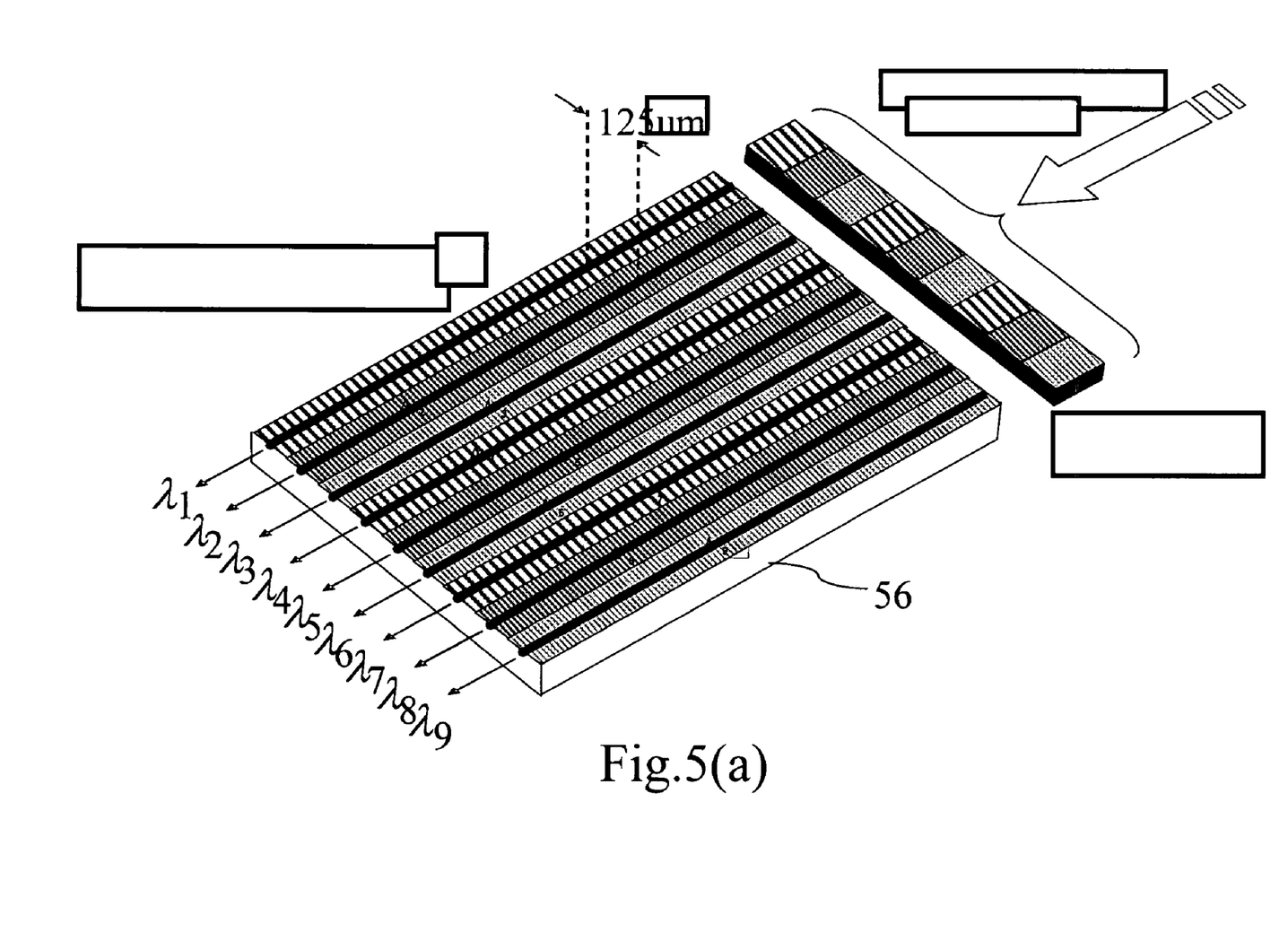
FIGS. 5(a)-5(b) are diagrams schematically showing two types of nonlinear optical waveguide arrays.
Figure 5B:
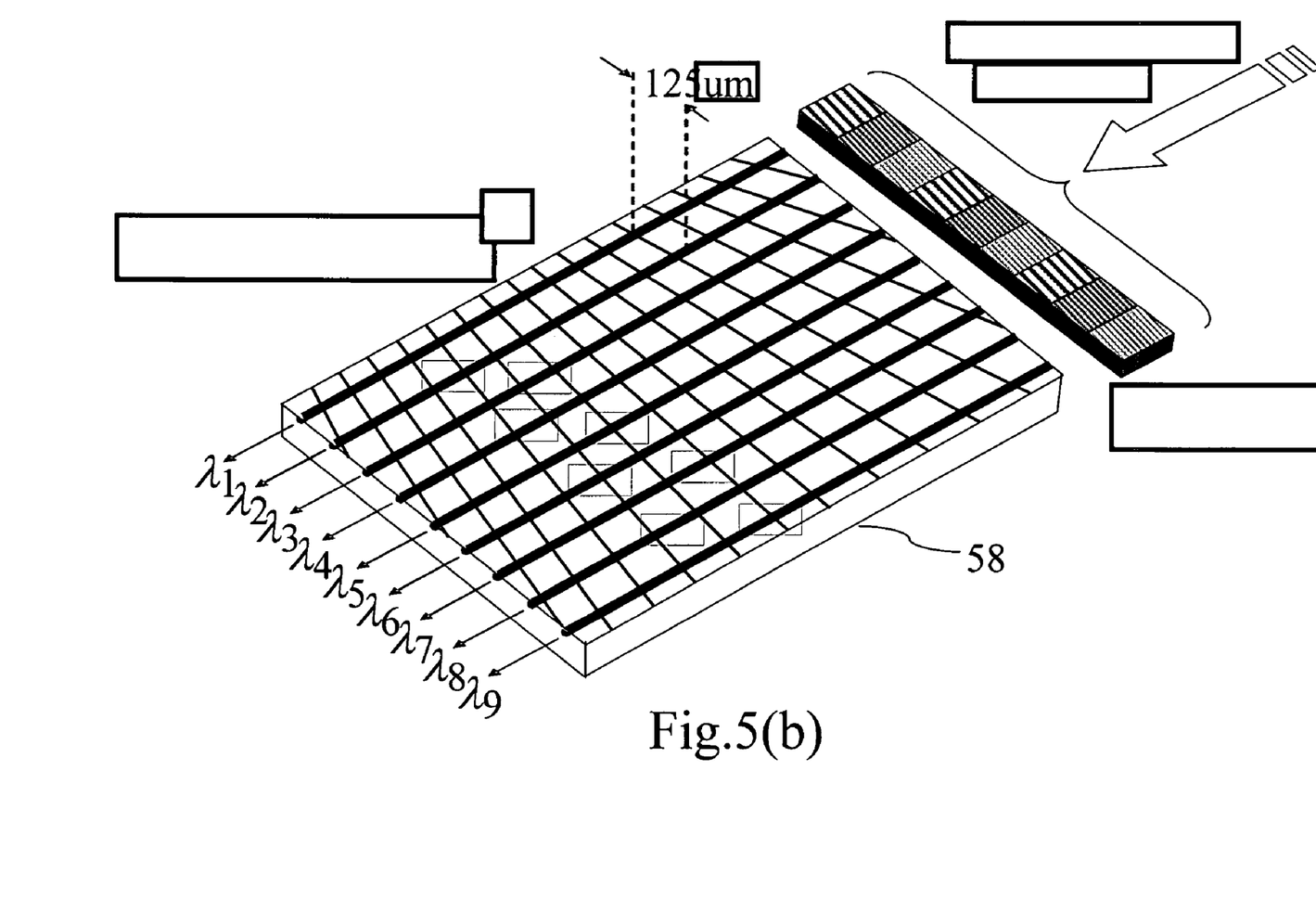

FIGS. 5(*a*)-5(*b*) diagrams schematically showing two types of nonlinear optical waveguide arrays. The nonlinear optical waveguide array may contains a plurality of multiple grating-period QPM gratings or fan-out grating-period QPM gratings. In FIG. 5(*a*), a plurality of QPM gratings with different grating periods is integrated into a multiple grating-period QPM grating array 56, wherein each channel has a width of 125 μm. If the waveguide array has a dimension of 1 mm, the array can contain 8 channels. The storage capacity is proportional to the number of channels. Therefore, the design of the QPM gratings is very important in the holographic storage device. FIG. 5(*b*) shows a fan-out grating-period QPM grating array 58. Varying the slope and density of the fan-out grating-period QPM gratings can obtain light beams of different wavelengths.

Figure 6A:
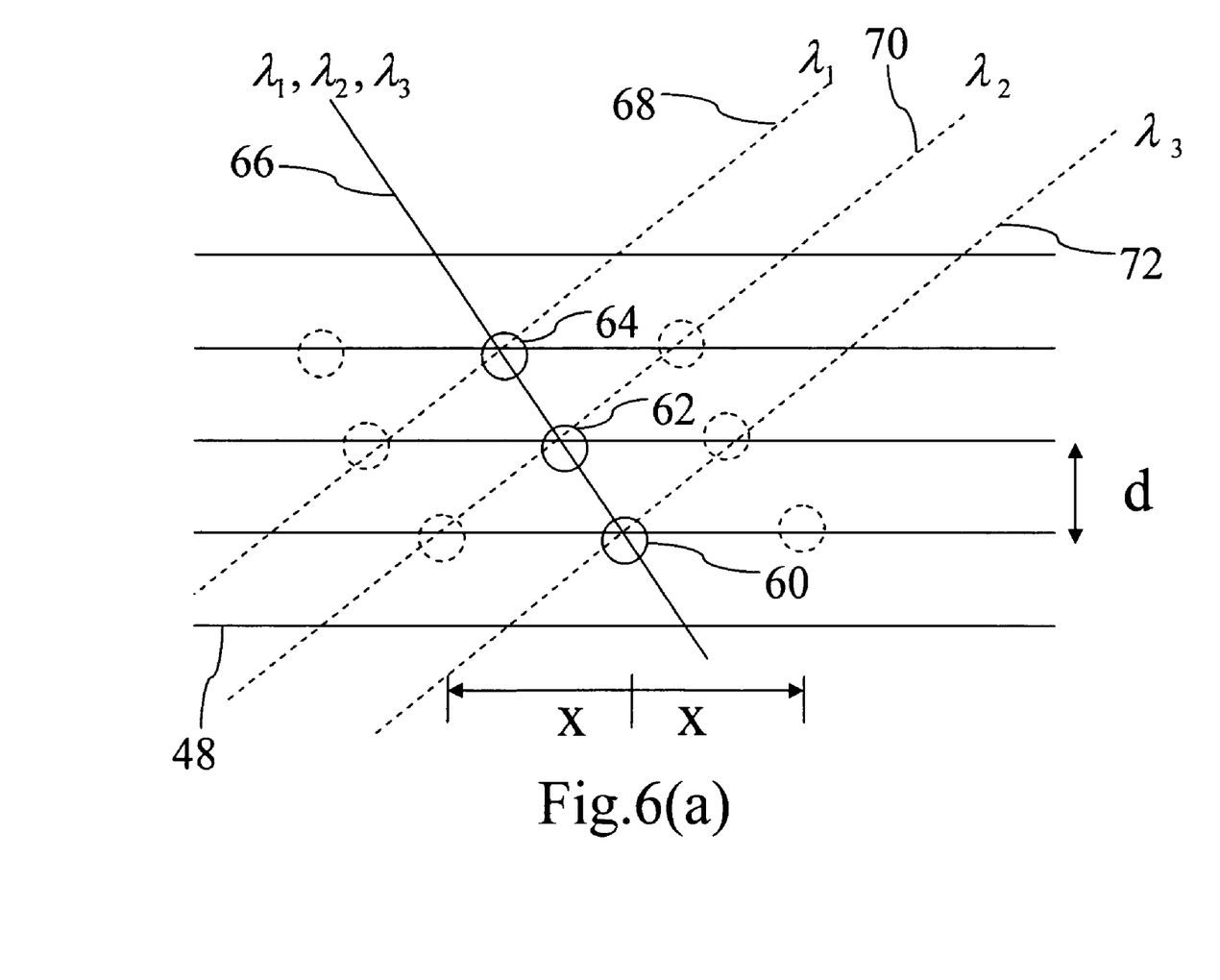
FIG. 6(a) is a diagram schematically showing that information is stored on a holographic disc according to the present invention.

Refer to FIG. 6(*a*) a diagram schematically showing the process that the holographic disc stores information according to the present invention. Suppose that a reference light beams 66 has a wavelength of $\lambda_1$, $\lambda_2$ or $\lambda_3$, and that a signal light beam 68 has a wavelength of $\lambda_1$, and a signal light beam 70 has a wavelength of $\lambda_2$, and a signal light beam 72 has a wavelength of $\lambda_3$. The abovementioned light beams can form interference patterns on some positions on different-depth storage layers of the holographic disc 48, and the interference patterns are stored on the positions, such as Positions 60, 62 and 64 in FIG. 6(*a*). If the signal light beams are sequentially emitted, the interference patterns are sequentially stored. If the signal light beams are simultaneously emitted, the interference patterns are simultaneously stored. If the incident reference light beam 66 is vertical to a level of the holographic disc 48, interference patterns are formed and stored on different-depth storage layers under the level of the holographic disc 48. If the holographic disc 48 rotates around the central axis leftward or rightward by a displacement X, the storage positions will be moved to the three dotted-line circles at the right or the left of the original three solid-line circles. To achieve a higher storage density, the holographic disc 48 is moved upward or downward by a distance of d, the storage positions denoted by the dotted-line circles on each storage layer can thus further store information of a different wavelength. In the example shown in FIG. 6(*a*), as each dotted-line circle can store the information of three wavelengths of $\lambda_1$, $\lambda_2$ and $\lambda_3$, the storage density is tripled. If N types of wavelengths are used, the storage density will increase by N times.

Figure 6B:
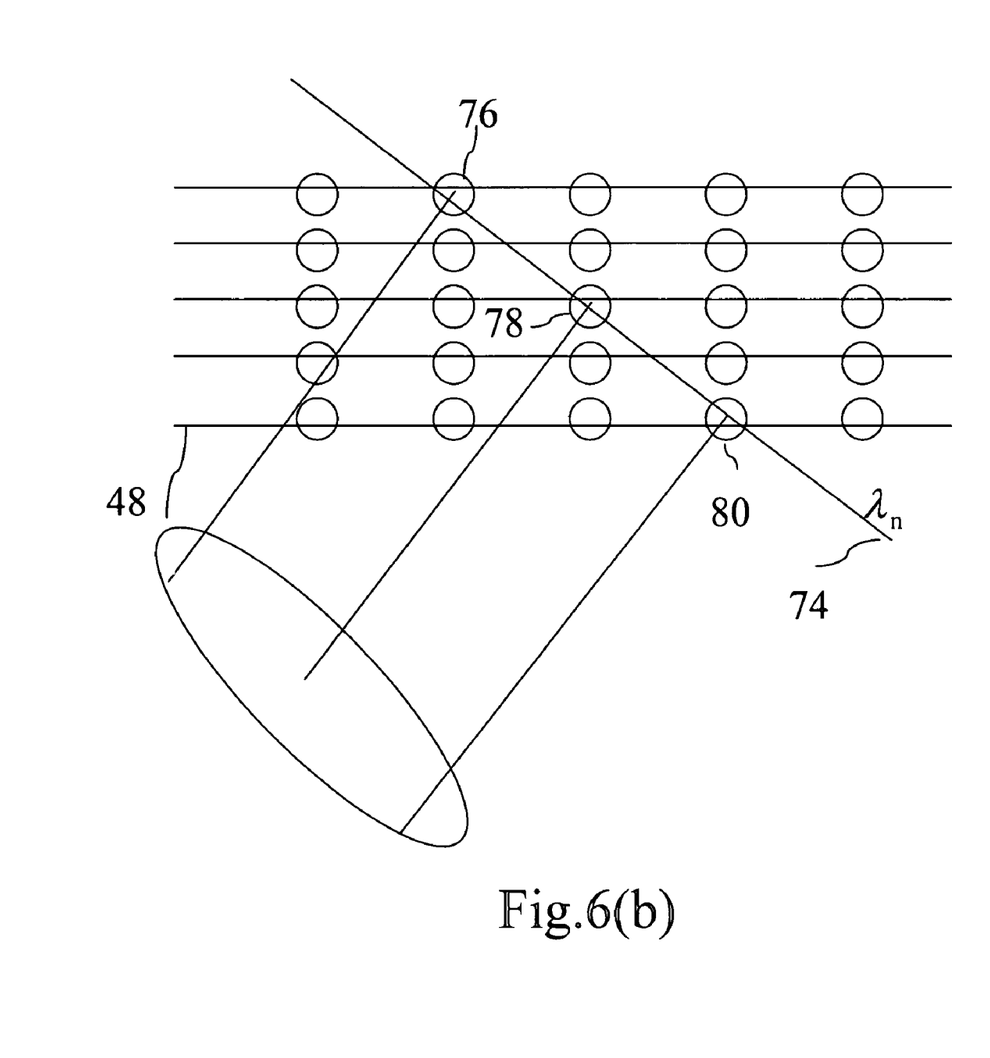
FIG. 6(b) is a diagram schematically showing that information is read out from a holographic disc according to the present invention.

Refer to FIG. 6(*b*) a diagram schematically showing the process that information is read out from the holographic disc according to the present invention. Suppose that information is recorded in the way described above, and that each of a first position 76, a second position 78 and a third position 80 stores information written with a light beam having a wavelength of $\lambda_n$. If the read light beam 74 has the same wavelength and incident angle as the reference light beam used in writing, the signal light beams will be reconstructed, and the information of the three abovementioned positions can thus be read out simultaneously. In other words, the wavelength-multiplex and space-multiplex holographic storage device of the present invention can read out a large amount of information per unit time. Therefore, the present invention is a storage device having a high data access rate.

In conclusion, the present invention can three-dimensionally store data and has a high access rate and a large storage capacity because of the wavelength-multiplex and space-multiplex features thereof.

The embodiments described above are only to exemplify the present invention but not to limit the scope of the present invention. Therefore, any equivalent modification or variation according to the spirit of the present invention is to be also included within the scope of the present invention.

What is claimed is:

1. A wavelength-multiplex and space-multiplex holographic storage device comprising;
    a storage medium;
    a plurality of signal light beams respectively having different wavelengths and illuminating said storage medium;
    at least one reference light beam illuminating said storage medium and interfering with said signal light beams to form a set of interference patterns, wherein said interference patterns are respectively stored on different-depth storage layers of said storage medium;
    a laser source assembly emitting a plurality of multi-longitudinal-mode laser beams;
    a nonlinear optical waveguide array comprising a plurality of optical waveguides, receiving said multi-longitudinal-mode laser beams and generating a plurality of spectrum-narrowed light beams respectively have different wavelengths;
    a splitter splitting said spectrum-narrowed light beams into said signal light beams and a plurality of base light beams;
    a plurality of spatial light modulators each bearing two-dimensional type information needed by holographic recording, receiving one of said signal light beams, and adding said two-dimensional information to one of said signal light beams;
    a plurality of lenses respectively receiving said signal light beams from said spatial light modulators and outputting said signal light beams to said storage medium;
    a coupling device coupling said base light beams into a single said reference light beam having different wavelengths; and
    a reflection device reflecting said reference light beam to said storage medium.

2. The wavelength-multiplex and space-multiplex holographic storage device according to claim 1 further comprising a control unit varying directions of said signal light beams and said reference light beam or moving said storage medium.

3. The wavelength-multiplex and space-multiplex holographic storage device according to claim 2, wherein said control unit varies directions of said signal light beams and said reference light beam to shift storage positions during a storage process.

4. The wavelength-multiplex and space-multiplex holographic storage device according to claim 2, wherein said control unit moves said storage medium to shift storage positions during a storage process.

5. The wavelength-multiplex and space-multiplex holographic storage device according to claim 2, wherein said control unit varies directions of said signal light beams and said reference light beam and moves said storage medium to shift storage positions during a storage process.

6. The wavelength-multiplex and space-multiplex holographic storage device according to claim 2, wherein said control unit moves said storage medium to rotate around a central axis of said storage medium.

7. The wavelength-multiplex and space-multiplex holographic storage device according to claim 1, wherein said laser source assembly is a coherent laser source assembly; said multi-longitudinal-mode laser beams are coherent laser beams; said signal light beams are coherent signal light beams; said reference light beam is a coherent reference light beam.

8. The wavelength-multiplex and space-multiplex holographic storage device according to claim 7 further comprising:
  a volume holographic grating using a filter or feedback mechanism to select different longitudinal modes to respectively narrow said multi-longitudinal-mode laser beams and increase coherent lengths thereof, and outputting spectrum-narrowed laser beams having different wavelengths to said nonlinear optical waveguide array; and
  a lens array focusing said multi-longitudinal-mode laser beams on said volume holographic grating.

9. The wavelength-multiplex and space-multiplex holographic storage device according to claim 8, wherein said volume holographic grating is a discrete-period volume Bragg grating, a continuously-varying-period volume Bragg grating, a fiber Bragg grating, or a high wavelength-selectivity optical grating.

10. The wavelength-multiplex and space-multiplex holographic storage device according to claim 1, wherein said nonlinear optical waveguide array is made of a nonlinear crystal.

11. The wavelength-multiplex and space-multiplex holographic storage device according to claim 1, wherein said nonlinear optical waveguide array contains multiple-period quasi-phase-matched (QPM) gratings or fan-out QPM gratings.

12. The wavelength-multiplex and space-multiplex holographic storage device according to claim 1, wherein said laser source assembly is a diode laser array or an optical fiber laser array.

13. The wavelength-multiplex and space-multiplex holographic storage device according to claim 1, wherein said laser source assembly has at least one laser emitter.

14. The wavelength-multiplex and space-multiplex holographic storage device according to claim 1, wherein said interference patterns are sequentially or simultaneously stored on said different-depth storage layers of said storage medium.

15. The wavelength-multiplex and space-multiplex holographic storage device according to claim 1, wherein said interference patterns are respectively stored on said different-depth storage layers under a level of said storage medium.

16. The wavelength-multiplex and space-multiplex holographic storage device according to claim 1, wherein said storage medium is a holographic disc.

* * * * *